Patented Oct. 24, 1939

2,176,879

UNITED STATES PATENT OFFICE 2,176,879

METHOD OF DISINTEGRATING, DISPERSING AND STABILIZING GRAPHITE AND PRODUCT

Floyd E. Bartell, Ann Arbor, Mich., assignor, by mesne assignments, to Acheson Colloids Corporation, New York, N. Y., a corporation of New York No Drawing. Application November 20, 1937, Serial No. 175,732

19 Claims. (Cl. 44—9)

This invention has for its object the production of colloidal or finely divided graphite which will be relatively stable with respect to flocculation or aggregation of the particles, when dispersed in strongly organophilic and substantially nonpolar, water-insoluble organic liquids, such as gasolines, kerosene, Diesel engine fuel oils, motor fuel blends, carbon tetrachloride, creosote, benzol, and the like. Suspensions of this type are useful as fuels for internal combustion engines, lubricants, penetrating and impregnating liquids, liquids for the production of surface coatings, etc. The gasolines or motor fuel blends may contain the usual ingredients such as petroleum distillation fractions, benzol, anti-knock ingredients, ingredients to prevent, reduce, or eliminate carbon deposits, ingredients to prevent gumming, other lubricants, etc. Previous attempts to stabilize suspensions of colloidal graphite against flocculation or aggregation of the particles when dispersed in such organic liquids have not, so far as I am aware, been successful.

A specific object of the present invention, therefore, is to provide a dispersion of colloidal or finely divided graphite which will have a high degree of stability even in solutions or suspensions of relatively high concentration in such organic liquids.

In accordance with the present invention graphite is mixed with a disintegrating agent which is soluble in liquids of the type referred to and is sufficiently adhesive and cohesive that when the mixture is subjected to a kneading or pulling action the graphite particles will be torn apart or disintegrated. There is incorporated in this mixture also a stabilizing agent added at the beginning, during, or at the end of the milling operation. The mixture is then milled, i. e. worked or kneaded to bring about disintegration of the graphite and coating of the particles with the stabilizing agent and the product is extended in the desired dispersion medium. The stabilizing agent must be a substance which will be strongly adsorbed by graphite and will remain adsorbed in the presence of a strongly organophilic and substantially non-polar, water-insoluble organic liquid and as a result of such adsorption, must so greatly lower the interfacial tension existing between graphite particles and the organic liquid that no tendency for flocculation of the graphite particles remains.

The exact degree of fineness of the resulting graphite is not of primary importance. The particles may vary in size, but a substantial portion of them should come within the particle size range generally designated for colloidal dimensions, i. e., up to approximately one micron maximum dimension. The finer the particles the slower will be their rate of settling in an extending medium and the greater their practical value. In general, the longer the kneading operation is continued the larger will be the proportion of the finer particles in the product. For example, the kneading operation may be continued until about 30% of the graphite is less than one micron in diameter.

The product of the mixing operation is dispersed in the organic liquid and is then ready for use. It may, if desired, be refined by separating the larger particles of the graphite by settling or centrifuging. If this refinement is carried to a sufficient extent, all particles of a size greater than about one micron may be precipitated and removed, thereby resulting in a diffusion of graphite, which graphite has excellent suspension properties. Graphite products are thus obtainable, practically all of the graphite content of which will remain in suspension even in very low viscosity organic liquids, such as commercial gasoline, for at least seven days. Such gasoline suspensions are suitable for bulk storage such as occurs in the distribution and marketing of commercial gasoline. In general, at least about 90% of the graphite content should remain suspended for a period of seven days and products are obtainable in which upwards of 97% will remain suspended for seven days.

The following example is illustrative:

About 72 parts by weight of powdered graphite, preferably of about 200-mesh fineness, are mixed with about 28 parts by weight of hydrogenated polymerized butadiene having a molecular weight of about 7000 and about 7.2 parts by weight of a mineral sulfonate, known as M-Soap or Mahogany Soap. The mixture is kneaded in a suitable device such as Banbury type mixer for about 12 to 24 hours and then thinned with a suitable mineral oil having a colloid stabilizing effect such as a steam refined mineral oil fraction having a specific gravity of about 20°–25° A. P. I., a flash point above 300° F., a fire point upward of about 335° F., and a viscosity at 210° F. of at least about 70 sec. Saybolt Universal. The fraction should be substantially free of precipitatable and tar matter and also free of electrolytes and chemicals such as might be introduced by chemical refining of the oil. An amount of the oil about equal in weight to the weight of the graphite may be employed. The resulting paste may then be added in any desired proportion to the organic liquid which is to serve as the final suspending medium and vehicle, such as gasoline, kerosene, oils, etc.

The coarser particles of the graphite which have not been sufficiently subdivided by the kneading operation tend to settle out in time and the product may be freed from these larger particles and refined by sedimentation methods, such as centrifuging or by other well-known methods ordinarily used for grading finely divided materials. The bulk of the suspended graphite, however, exhibits little tendency to settle out and remains suspended for a long period of time. The suspended, finely divided graphite is highly stable and exhibits practically no tendency to flocculate or aggregate while in diffusion. While the larger particles may tend to settle slowly when dispersed in a low viscosity liquid, such as gasoline, the absence of flocculated or aggregated groups of particles in the diffusion largely avoids this objectionable characteristic associated with graphite suspensions in low viscosity liquids heretofore produced. The product is valuable, therefore, as compared with prior products, primarily on account of its stability against flocculation. The relatively small average particle size of the product also is an important consideration. As stated, a considerable portion of the graphite is of a particle size of 0.25 micron or less. This extremely fine graphite is particularly useful in lubrication and in the use of the material as an impregnating agent. The slow settling properties of the product are more particularly attributable to the non-flocculating properties of the graphite because, although the larger unflocculated particles tend to settle slowly, flocculated masses, were they present, regardless of the size of the individual particles making up such flocculated masses, would tend to settle much more rapidly as masses than as individual particles.

The specific procedure described above is capable of variation as will appear from the following discussion:

The graphite supplied to the disintegrating operation preferably is of a fineness of 200 mesh or finer and may be either natural or artificial and of the various grades available. The proportions of the graphite, the disintegrating agent and the stabilizing agent may be varied within wide limits. For the milling operation it is generally preferred to use the largest possible proportion of graphite to disintegrating agent so long as the mixture maintains its viscous, plastic character. The relative amount of the stabilizing agent may be varied. The amount used depends largely upon the desired degree of stability of the product against flocculation in the extending medium. Any suitable type of mixing or kneading device may be used and the time of kneading may be varied at will. The disintegrating agent must, as stated, be soluble in or miscible with the stabilizing agent used, and also soluble in the organic liquid such as kerosene which is to serve as the final suspending medium. It must also be sufficiently fluid to be worked and sufficiently viscous and adhesive to tear apart and break down the graphite particles in the kneading operation. A product obtainable from Advance Solvents and Chemical Corporation under the name Vistanex and which is the hydrogenated polymerized butadiene above referred to has been found to be suitable. Substitutes for the stabilizing agent referred to in the specific example may be other well known equivalent agents, i. e., agents which are strongly adsorbed by the graphite and will remain adsorbed in the presence of the dispersion medium and thus function as stabilizing agents. Such agents include the product known as M-Soap, which is obtainable from Quaker Chemical Products Corporation, of Conshohocken, Pennsylvania; lecithin, which has been found to be effective; and certain mineral oil fractions such as that described in the foregoing specific example which have been found to have the desired colloid stabilizing characteristic. The M-Soap contains about 43% of mineral sulfonate the bulk of the remainder being mineral oil. The neutral mineral oil suitably is incorporated into the mixture in the mill at the end of the kneading operation. The characteristics of the neutral mineral oil have been noted above. Various grades of oil and different viscosities may be used so long as they are freely miscible with the disintegrating agent and the colloid stabilizing agent if used and soluble in the final dispersion medium and free of electrolytes or other impurities which would destroy or injure the non-flocculating character of the graphite. It is desirable to combine the stabilizing effects of the M-Soap and the mineral oil as shown in the example, but it is practicable to omit the M-Soap and depend upon the mineral oil alone for its stabilizing effect. When lecithin is employed as the stabilizer it is found unnecessary to also stabilize with the mineral oil.

The product as stated is practically free of floccs and aggregates of particles and may be extended in low viscosity liquids such as commercial gasoline without flocculation. Upon examination with an ultra microscope, or oil immersion microscope, at a magnification of about 677, it will be seen to contain a substantial proportion of particles of sub-micron size, i. e., 0.25 micron or less, and to be free of aggregations of more than two discrete particles and generally even free of couples, i. e., two individual particles of graphite joined together.

When I refer to motor fuel I mean liquid fuel for internal combustion engines, such as benzol, kerosene, creosote, cracked and natural gasolines, Diesel engine fuel oil, and combinations thereof, with or without additions such as lubricants, antiknock agents, carbon inhibitors, gum inhibitors, etc.

I claim:

1. A composition comprising colloidal graphite in non-flocculated form dispersed in an organophilic and substantially non-polar water-insoluble organic liquid, said composition containing also a stabilizing agent which is strongly adsorbed to the graphite and remains adsorbed when in contact with said organic liquid and prevents flocculation of the graphite by lowering the interfacial tension between the graphite and said organic liquid, said agent having a stabilizing efficiency substantially equivalent to that of lecithin.

2. A composition as defined in claim 1 in which said organic liquid comprises a mineral oil having a viscosity of at least about 70 sec. Saybolt Universal at 210° F.

3. A composition as defined in claim 1 in which said organic liquid comprises a motor fuel.

4. A composition as defined in claim 1 in which said organic liquid comprises a gasoline.

5. A composition as defined in claim 1 in which said organic liquid comprises kerosene.

6. A composition as defined in claim 1, said composition being substantially free of particles having a maximum dimension greater than 1 micron.

7. A composition as defined in claim 1, said composition being substantially free of particles having a maximum dimension greater than 1 micron and containing a substantial portion of graphite in the form of particles having a maximum dimension not greater than 0.25 micron.

8. A composition as defined in claim 1 in which a substantial portion of the graphite content of the composition is in the form of particles having a maximum dimension of 1 micron.

9. A composition as defined in claim 1 containing in addition a viscous adhesive disintegrating agent which is soluble in the organic liquid.

10. A composition as defined in claim 1 containing in addition a hydrogenated polymerized butadiene.

11. A composition as defined in claim 1 in which the organic liquid is gasoline and in which at least 90% of the graphite content will remain suspended for at least 7 days.

12. A composition as defined in claim 1 in which the organic liquid is gasoline and in which at least 97% of the graphite content will remain suspended for at least 7 days.

13. A composition as defined in claim 1 in which the stabilizing agent comprises mineral sulfonate and a neutral mineral oil having colloid stabilizing properties.

14. Method of disintegrating, dispersing, and stabilizing graphite which comprises kneading a plastic mixture of graphite of about 200 mesh or finer with a hydrogenated polymerized butadiene having a molecular weight of about 7000 and a mineral sulfonate for several hours, incorporating a neutral mineral oil into the kneaded mixture and extending the resulting mixture in a strongly organophilic and substantially non-polar, water-insoluble organic liquid.

15. Method of disintegrating, dispersing, and stabilizing graphite which comprises kneading a plastic mixture of graphite with a hydrogenated polymerized butadiene and a mineral sulfonate for several hours, incorporating a neutral mineral oil into the kneaded mixture and extending the resulting mixture in strongly organophilic and substantially non-polar, water-insoluble organic liquid.

16. A composition comprising colloidal graphite, hydrogenated polymerized butadiene, mineral sulfonate, neutral mineral oil and strongly organophilic and substantially non-polar, water-insoluble organic liquid, said composition containing a substantial proportion of graphite particles of a size in the neighborhood of 0.25 micron and free of flocculated masses of graphite particles.

17. A composition as described in claim 16 wherein the organic liquid is gasoline.

18. A composition as defined in claim 1 in which the stabilizing agent is an oil soluble mineral oil sulfonate.

19. A composition as defined in claim 1 in which the stabilizing agent is lecithin.

FLOYD E. BARTELL.